United States Patent
Wakiyama et al.

(10) Patent No.: US 7,945,964 B2
(45) Date of Patent: May 17, 2011

(54) APPARATUS STRUCTURE AND SCANNING PROBE MICROSCOPE INCLUDING APPARATUS STRUCTURE

(75) Inventors: Shigeru Wakiyama, Chiba (JP); Kenichi Akamatsu, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 277 days.

(21) Appl. No.: 12/415,237

(22) Filed: Mar. 31, 2009

(65) Prior Publication Data
US 2009/0255016 A1 Oct. 8, 2009

(30) Foreign Application Priority Data
Apr. 3, 2008 (JP) .................................. 2008-096894

(51) Int. Cl.
*G12B 21/08* (2006.01)
(52) U.S. Cl. ............... 850/29; 850/40; 850/48; 850/53; 73/105
(58) Field of Classification Search ............ 850/21, 850/29, 40, 48, 53; 73/105
See application file for complete search history.

(56) References Cited

U.S. PATENT DOCUMENTS
6,772,642 B2 * 8/2004 Hajduk et al. .................. 506/12
7,397,534 B2 * 7/2008 Iwata et al. ..................... 355/53

FOREIGN PATENT DOCUMENTS
| | | |
|---|---|---|
| JP | 10-282118 | 10/1998 |
| JP | 2002-350320 | 12/2002 |
| JP | 2002-350321 | 12/2002 |
| JP | 2005-061877 | 3/2005 |
| JP | 2006-098794 | 4/2006 |

OTHER PUBLICATIONS

Alexander et al., "An atomic-resolution atomic force microscope implemented using an optical lever", Journal of Applied Physics, 1989, vol. 65(1), pp. 164-167.
Binnig et al., "Atomic Force Microscope", Physical Review Letters, 1986, vol. 56, No. 9, pp. 930-933.
Erlandsson et al., "Atomic force miscroscopy using optical interferometry", Journal of Vacuum Science Technology, Mar./Apr. 1988, A6(2), pp. 266-270.

* cited by examiner

*Primary Examiner* — Kiet T Nguyen
(74) *Attorney, Agent, or Firm* — Brinks Hofer Gilson & Lione

(57) ABSTRACT

Provided are a structure of an apparatus for analysis, inspection, and measurement in which a support structure supporting a detection unit is resistant to disturbance, suppresses a reduction in resolution during large-sample measurement, and has high rigidity, and a probe microscope using the apparatus structure. The apparatus structure supporting the detection unit which is opposed to a sample which is located on a unit movable in at least one axis direction and is an object to be analyzed has an arch shape. In the apparatus structure having the arch shape and supporting the detection unit, a surface substantially perpendicular to a flat surface portion of a sample holder located immediately under the apparatus structure is formed. The detection unit is supported on the perpendicular surface. The arch-shaped apparatus structure is a curved structure consistent with a catenary curve.

5 Claims, 10 Drawing Sheets

F I G. 1
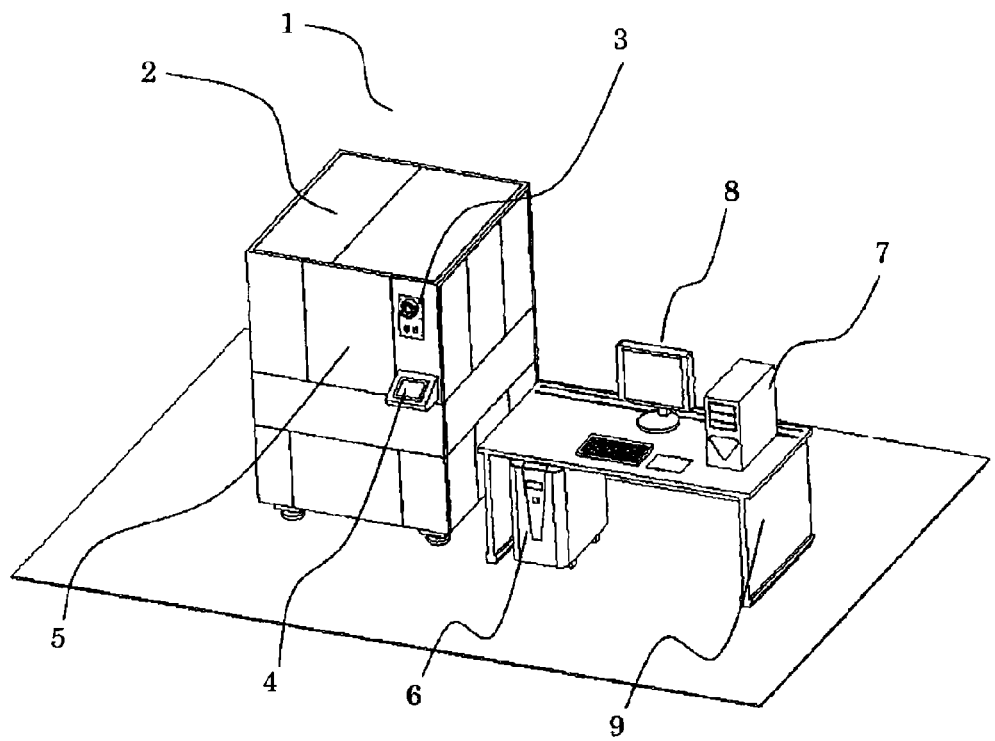

F I G. 2
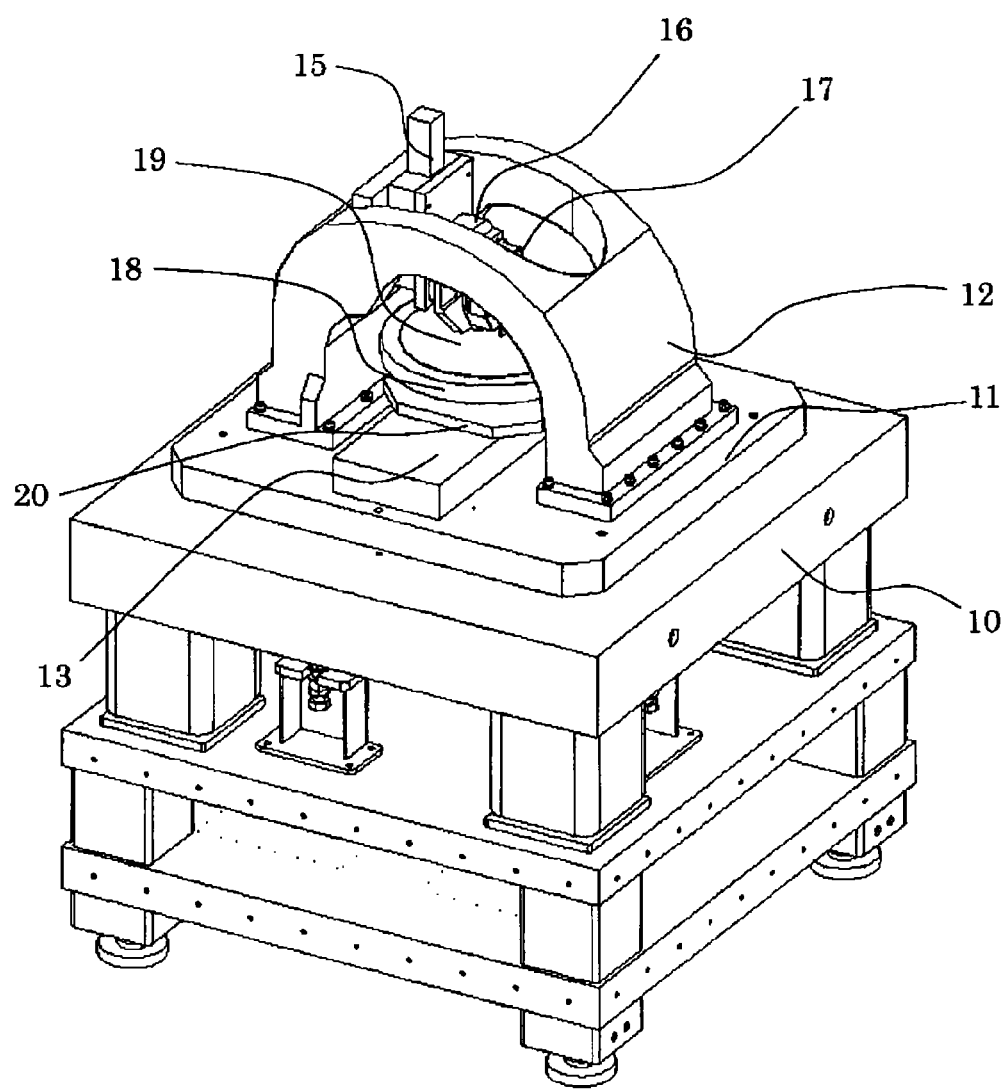

F I G. 3
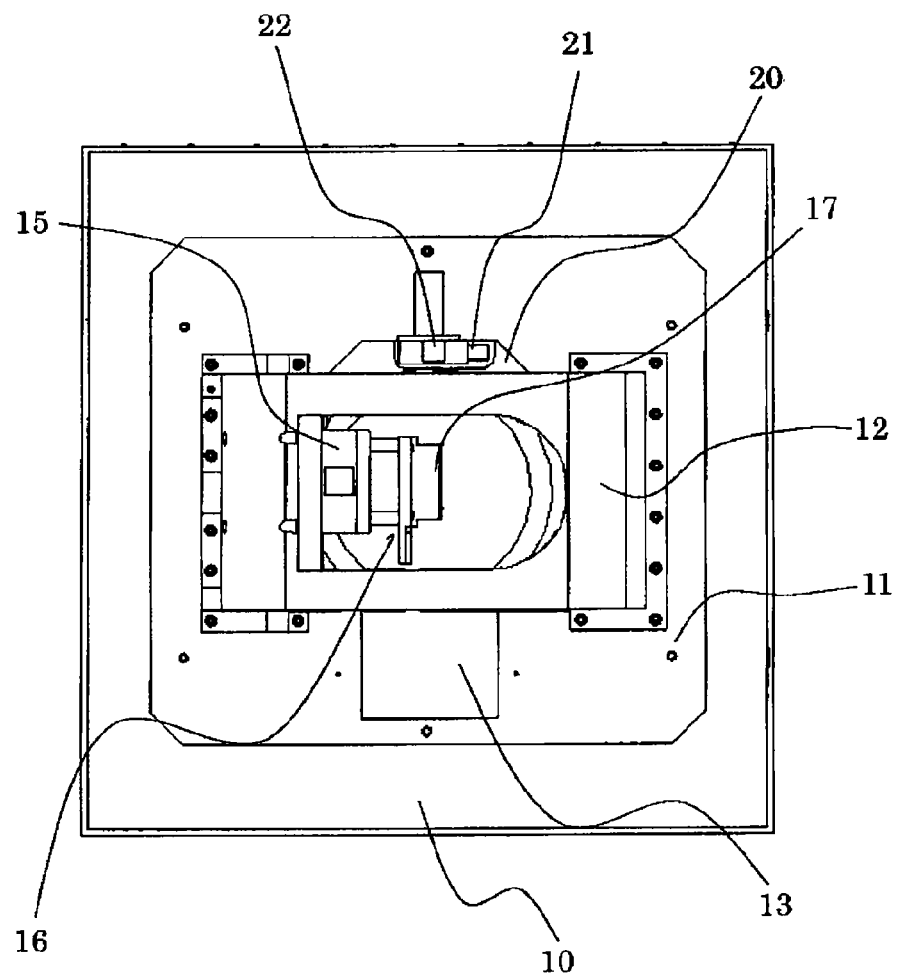

F I G. 7
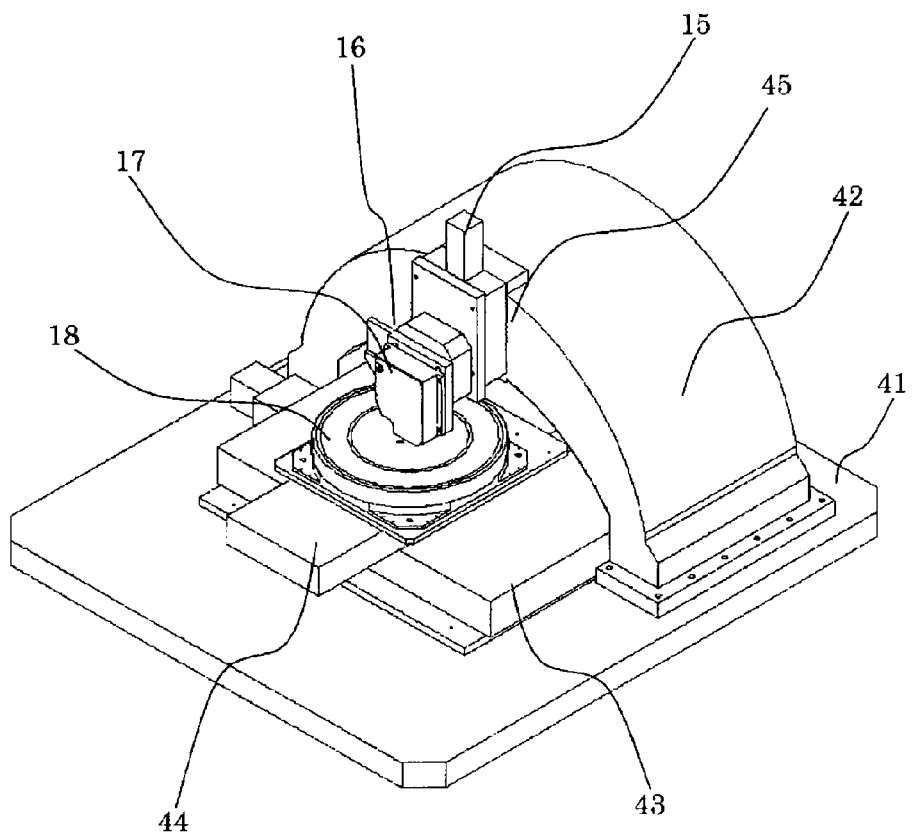

APPARATUS STRUCTURE AND SCANNING PROBE MICROSCOPE INCLUDING APPARATUS STRUCTURE

RELATED APPLICATIONS

This application claims priority under 35 U.S.C. §119 to Japanese Patent Application No. JP2008-096894 filed on Apr. 3, 2008, the entire content of which is hereby incorporated by reference.

BACKGROUND OF THE INVENTION

1. Field of the Invention

The present invention relates to a structure of an analysis, inspection, or measurement apparatus including a sample analysis apparatus, a shape measurement apparatus, and a probe microscope for measuring shape information such as surface roughness or a step of a sample surface, or physical information such as a dielectric constant or viscoelasticity.

2. Description of the Related Art

In recent years, a probe microscope including an atomic force microscope (AFM) with atomic resolution has been expected for shape measurement to evaluate a fine shape. The atomic force microscope which is a type of probe microscope has been expected as means for observing a surface shape of a novel insulating material and the study thereof has been advanced since G. Binnig, et al., who invented a scanning tunneling microscope (STM), devised the atomic force microscope (see, for example, G. Binnig, C. F. Quate, and Ch. Gerber, "Atomic Force Microscope", Physical Review Letters, American, Physical Society, 1986, Vol. 56, No. 9, p. 931).

The principle of the probe microscope is as follows. A physical force acting between a sample and a probe whose tip end is sufficiently sharpened is measured as a displacement of a spring element attached with the probe. A surface of the sample is scanned so as to maintain the amount of displacement of the spring element to a constant value. A control signal for maintaining the amount of displacement of the spring element to the constant value is used as shape information to measure the shape of the surface of the sample.

Examples of means for detecting the displacement of the spring element include an optical system and a self detection system for detecting deformation distortion of the spring element as an electrical signal.

Examples of the optical system which have been reported include a system using a so-called interference method (see, for example, R. Erlandsson, G. M. McClelland, C. M. Mate, and S. Chiang, "Atomic force microscopy using optical interferometry", Journal of Vacuum Science Technology, March/April 1988, A6(2), pp. 266-270) and a system called an optical lever system for emitting laser light to a spring element and detecting a positional deviation of reflected light by a photo detector to generate a displacement signal (see, for example, S. Alexander, L. Hellemans, O. Marti, J. Schneir, V. Elings, P. K. Hansma, Matt Longmire, and John Gurley, "An atomic-resolution atomic force microscope implemented using an optical lever", Journal of Applied Physics, 1989, 65(1), pp. 164-167). Each of the systems is mainly used as a detection system for the probe microscope.

In recent years, the following self detection system has been known in which a lever portion having a probe provided at the tip end thereof and a support portion supporting the lever portion are connected to each other by two bending portions used as regions for forming two piezoelectric resistors, and a resistance difference between the piezoelectric resistors, indicating a displacement difference between both the bending portions which is caused by the twisting of a cantilever is measured to control the cantilever (see, for example, JP 2006-098794 A, FIG. 1).

A probe microscope in which a probe opposed to a sample receives an interatomic force from the sample is called the atomic force microscope, and a probe microscope in which a probe receives a magnetic force from a sample is called a magnetic force microscope. Therefore, such probe microscopes can detect various forces generated from the samples to observe states of the samples.

FIG. 8 illustrates a structure of a normal probe microscope. A sample 51 to be measured is placed on a fine movement mechanism 52 for three-dimensionally moving the sample. The fine movement mechanism 52 normally includes piezoelectric elements deformed in response to an applied voltage, and finely adjusts a position of the sample relative to a probe 53 opposed to the sample. The probe 53 is provided at a tip end of a cantilever 54 which is a beam member supported at only one end. FIG. 9 illustrates a normal shape of the cantilever. A cantilever substrate 64 is provided with the cantilever 54 which is the beam member supported at only one end. The probe 53 is formed at the tip end of the cantilever 54 and has mainly a triangular or square pyramid shape or a circular cone with a height of 1 µm to 2 µm. The cantilever substrate 64, the cantilever 54, and the probe 53 are made of silicon or a silicon-based material and integrally formed by processing using, for example, an anisotropic etching technique.

The cantilever substrate 64 including the cantilever 54 is held by a cantilever holder 55. The fine movement mechanism 52 is located on a mechanical alignment mechanism (rough movement mechanism) 56, such as a stage, for bringing the sample 51 and the probe 53 close to each other. A displacement detection system 57 for detecting deformation of the cantilever based on a physical amount such as an interatomic force, which the probe receives from the surface of the sample, is provided on the cantilever side. An optical lever system for enlarging distortion deformation of the cantilever by laser light from a laser transmitter 58 and for detecting a positional displacement of the laser light by a photo detector 59 is normally used as the displacement detection system. A signal from the displacement detection system 57 is sent through an amplifier 60 to a Z-axis control feedback circuit 61 for controlling a Z-axis (vertical direction) interval between the sample 51 and the probe 53 to perform scanning with the fine movement mechanism 52, thereby controlling a Z-axis positional relationship between the sample 51 and the probe 53. In-plane scanning between the sample 51 and the probe 53 is performed by scanning with the fine movement mechanism based on a signal from an XY-driver circuit 62. The Z-axis control and the XY-driving are performed by a computer and a control system 63. An in-plane shape of the sample and physical properties thereof are visually imaged based on the control signals.

In the example described above, the sample is three-dimensionally moved during scanning. The fine movement mechanism may be provided on the probe side. A mechanism for performing in-plane (two-dimensional) alignment between the sample and the probe (such as stage) may be provided on the probe side or the sample side.

In particular, when the sample is large, a normal structure is as follows. The fine movement mechanism is provided on the probe side. The sample is opposed to the probe. An in-plane moving means such as a stage mechanism, for moving the sample is provided in order to cover an operation region of the fine movement mechanism.

Examples of the large sample include a silicon wafer and a glass substrate. Several probe microscopes for measuring the large samples have been studied (see, for example, JP 2006-098794 A (FIG. 1), JP 2002-350320 A (FIGS. 1, 7, and 9), JP 2002-350321 A (FIGS. 5 and 6), JP 2005-061877 A (FIGS. 8 and 9), and JP 10-282118 A (FIGS. 1 and 2)).

The probe microscope for measuring the wafer or the glass substrate normally includes the probe and the fine movement mechanism for performing three-dimensional scanning with the probe, which are opposed to an object to be measured, and is described with reference to FIGS. 10 and 11.

A unit section 71 having a detection function is normally provided above a vibration isolation table surface plate 72 for suppressing the transmission of floor vibration, and contained in an acoustic insulating cover for suppressing the transmission of surrounding acoustic vibration. The unit section 71 is located on a base 74 provided on the vibration isolation table surface plate 72 through elastic materials 73. A rough alignment mechanism 76 for aligning a sample 75 in an in-plane direction, an XY-stage in this example, is provided above the base 74. The sample 75 is held above the XY-stage through a sample table 77. A detection means support structure member 78 is provided on the base 74. A Z-axis stage 79 which is a vertical direction alignment mechanism is held to the detection means support structure member 78, and a fine movement mechanism 80 which is a fine alignment mechanism is held thereto through the Z-axis stage 79. A cantilever 81 is held to a tip end of the fine movement mechanism 80. The probe provided at a tip end of the cantilever 81 is aligned to a surface of the sample 75 by the Z-axis stage 79. Distortion deformation of the cantilever 81 relative to the surface of the sample which is caused by the in-plane operation of the fine movement mechanism 80 is detected by an optical lever mechanism (not shown) provided in the fine movement mechanism 80, to control the fine movement mechanism 80 in the vertical direction, thereby measuring the physical properties of the surface of the sample or the shape thereof based on information obtained by the three-dimensional operation of the probe. In this example, an optical microscope 82 for observing the position of the sample is provided. The optical microscope is constructed such that an objective lens can be replaced by an electrically driven revolver. An image is displayed on a monitor or a display through a CCD camera.

As described above, the sample which is the object to be observed is located, through the sample holder, on the in-plane moving mechanism (stage) for shifting the sample observation position. The detection portion is opposed to the sample, and the cantilever is attached to the end of the detection portion. The detection means is held to the detection means support structure member through the moving mechanism for aligning the probe provided at the tip end of the cantilever to an interatomic force detection position which is an observation region. In particular, when the sample which is the object to be observed is large, the support portion structure supporting the detection means has a gate shape, and thus requires at least a structure width larger than an outer size of the sample. The resolution of the apparatus is determined based on the detection capacity of the detection portion and the resistance of the apparatus to disturbance. With respect to the resolution of the atomic force microscope, when the rigidity of, an apparatus structure, particularly, the support structure member of the detection means is low, a relative position between the probe and the surface of the sample opposed to the detection portion varies to induce a reduction in resolution. A disturbance vibration causes an increase in contact frequency between the probe and the surface of the sample, and hence it is likely to break the tip end of the probe, thereby causing a reduction in resolution.

SUMMARY OF THE INVENTION

The present invention has been made in order to solve the problems described above. Therefore, an object of the present invention is to provide an analysis apparatus structure in which a support structure supporting detection means is resistant to disturbance, suppresses a reduction in resolution during large-sample measurement, and has high rigidity for an analysis apparatus, and a probe microscope including the apparatus structure.

In order to solve the problems described above, according to the apparatus structure in the present invention and the probe microscope including the apparatus structure, the followings are provided.

For example, to take a case of an analysis apparatus as an example for description of the apparatus structure for analysis, inspection, or measurement, regarding a support structure supporting detection means including a detection portion for the analysis apparatus, an outer shape of a support structure member supporting the detection means opposed to a sample which is an object to be analyzed is an arch shape (catenary curve). The detection means is supported on a perpendicular surface which is formed in a portion of the support structure member having the arch shape and which is perpendicular to a flat surface portion of a sample stage.

The support structure member supporting the detection means is formed into the arch shape, the perpendicular surface is formed in the support structure member having the arch shape, and the detection means is supported on the perpendicular surface, thereby reducing a relative shift due to disturbance between the detection means supported by the support structure member and an object to be detected which is opposed to the detection means. As a result, a noise component can be reduced. The curved structure having the arch shape is a structure formed consistent with the catenary curve (catenary), and hence local stress concentration can be avoided to obtain higher rigidity than in a conventional support structure. From the reason described above, it is more preferable to integrally form the support structure member having the arch shape to obtain further higher rigidity. With the apparatus structure according to the present invention, the improvements of resolution and disturbance vibration resistance can be expected as described above. Therefore, the apparatus structure is effective in a case where the detection portion is at least a detection portion for performing analysis, inspection, or measurement on the physical properties or shape of the sample based on any one of electronic principles of optical, magnetic, and electron microscopes. The apparatus structure is also effective for an apparatus including an alignment mechanism for controlling a relative position between the detection portion and the sample located on the sample stage. Therefore, when the apparatus structure is used for a probe microscope whose detection means has a high-sensitive detection portion capable of measuring an atomic structure and physical properties, high-resolution sample analysis or shape measurement can be achieved and noise is reduced to improve the reliability of a result obtained by measurement. Thus, the apparatus structure is particularly effective.

BRIEF DESCRIPTION OF THE DRAWINGS

In the accompanying drawings:

FIG. 1 is a structural view illustrating an outline of a probe microscope apparatus according to a first embodiment of the present invention;

FIG. 2 illustrates a probe microscope internal unit of the probe microscope apparatus according to the first embodiment of the present invention;

FIG. 3 is a top view illustrating the probe microscope internal unit of the probe microscope apparatus according to the first embodiment of the present invention;

FIG. 7 illustrates a probe microscope internal unit of a probe microscope apparatus according to a second embodiment of the present invention;

DETAILED DESCRIPTION OF THE PREFERRED EMBODIMENTS

Figure 8:
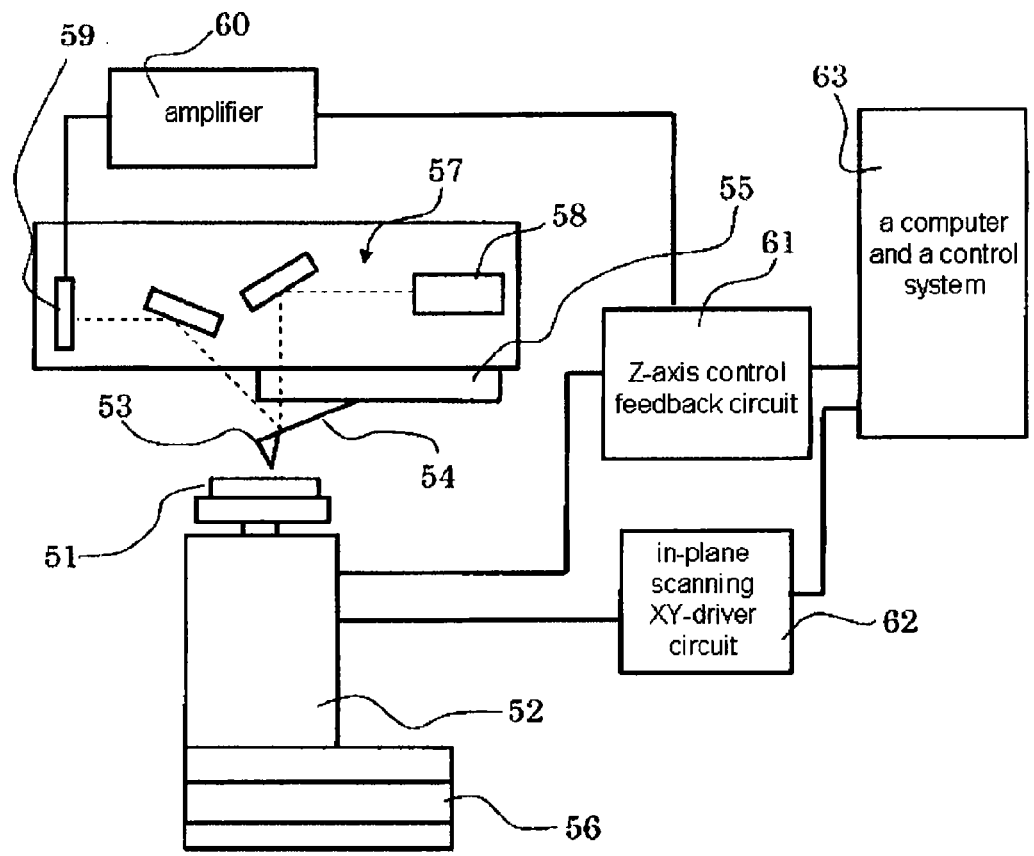
FIG. 8 is a structural view illustrating a schematic system of a probe microscope.
Figure 9:
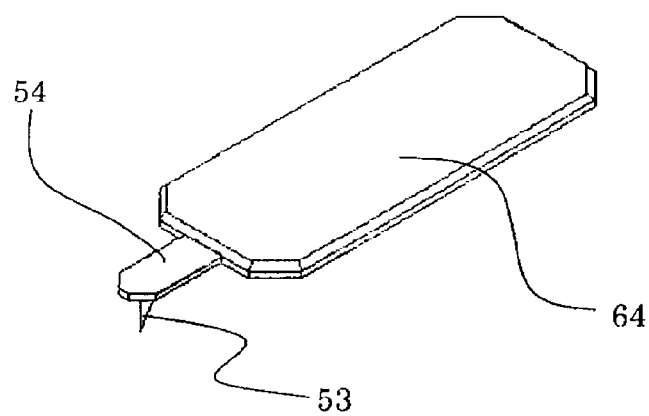
FIG. 9 is a structural view illustrating a normal cantilever shape.
Figure 10:
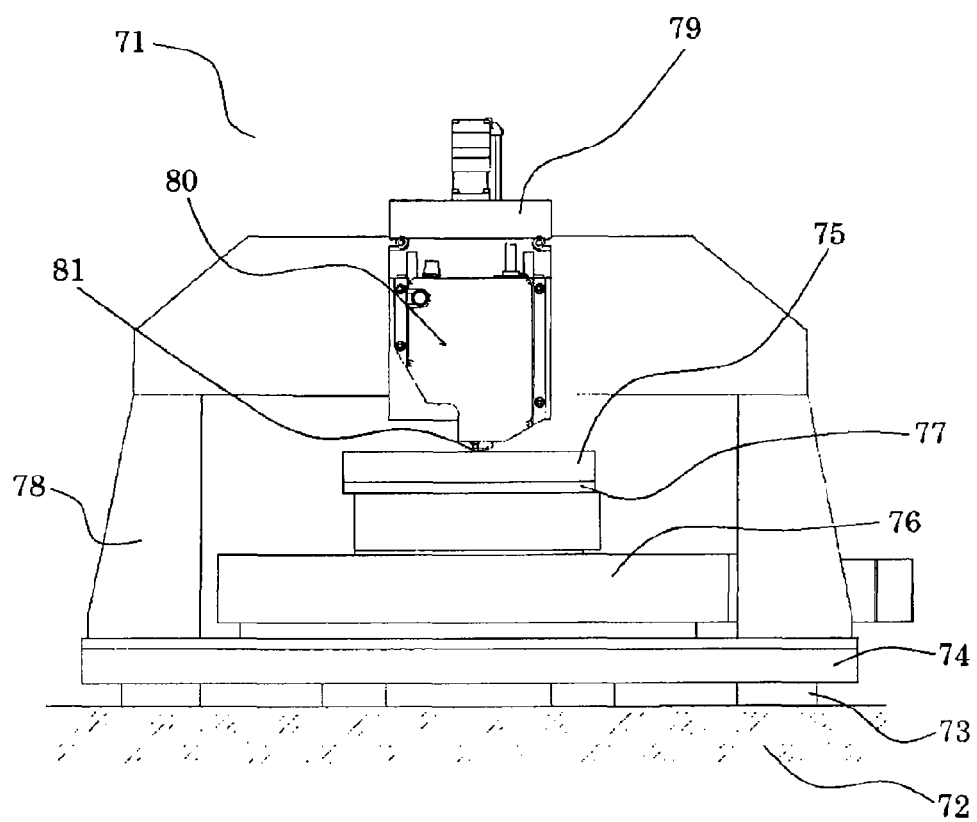
FIG. 10 is a side view illustrating an example of a conventional probe microscope unit for large-sample observation.
Figure 11:
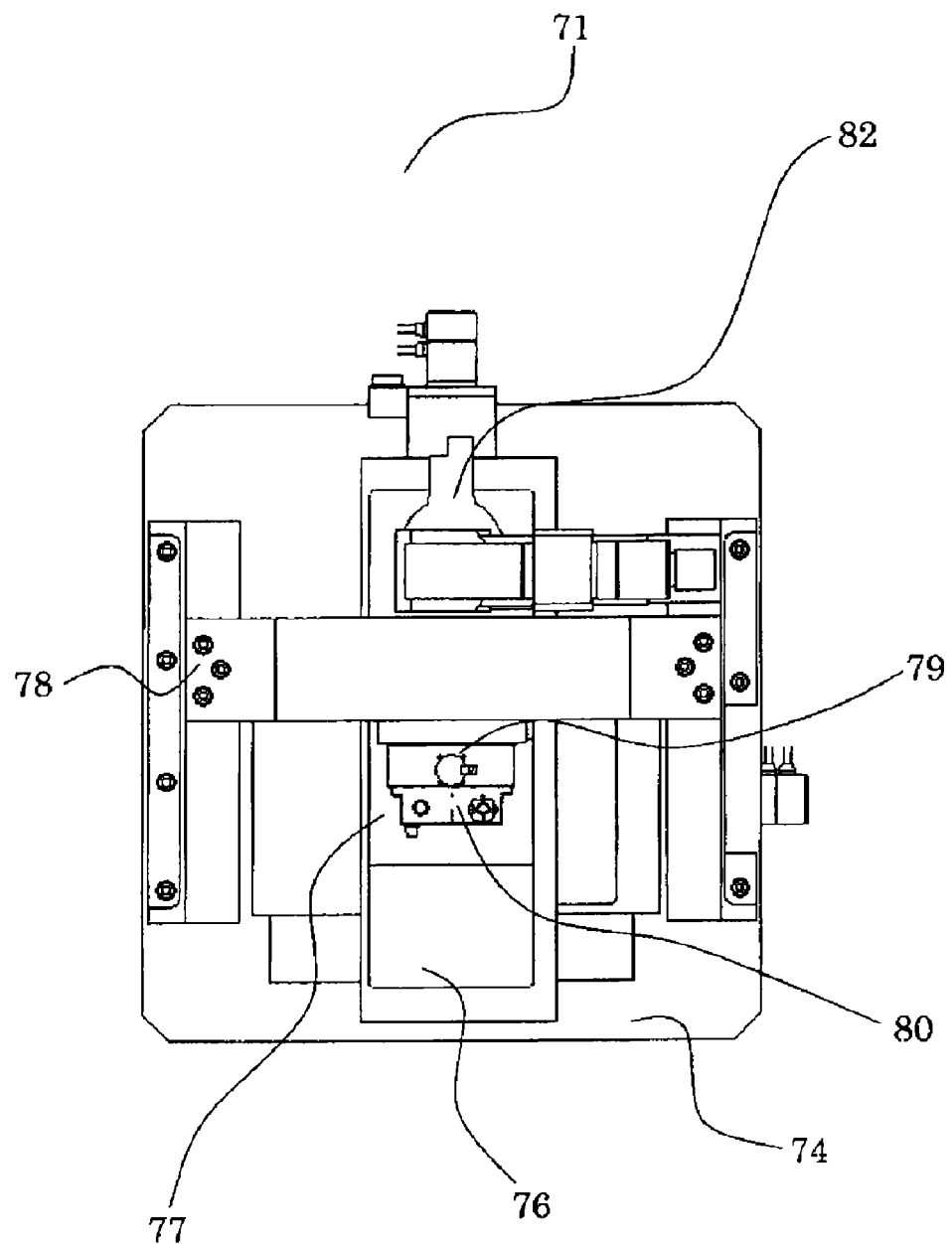
FIG. 11 is a top view illustrating the example of the conventional probe microscope unit for large-sample observation.

Hereinafter, an example of an apparatus structure according to a first embodiment of the present invention in a case of a probe microscope is described with reference to FIGS. 1 to 5. In the following embodiment, fundamentally the same structures as the schematic system structure of the probe microscope as illustrated in FIG. 8 are expressed by the same reference numerals and thus the description is omitted here.

FIG. 1 illustrates a probe microscope apparatus according to the first embodiment of the present invention. A probe microscope unit 1 is covered with an acoustic insulating cover 2 for protecting a probe microscope internal unit from acoustic noise. An operating panel 3 including a system ON/OFF switch and an emergency stop switch, an operating section 4 including a liquid crystal touch panel for instructing a stage operation, and a door 5 for operating the probe microscope internal unit located inside the acoustic insulating cover 2 are provided on the acoustic insulating cover 2. A control electrical component 6 for controlling the probe microscope, a computer 7 for generating various instructions, and a display 8 are located on the right side of the probe microscope unit 1 and provided on a desk 9, respectively.

Figure 4:
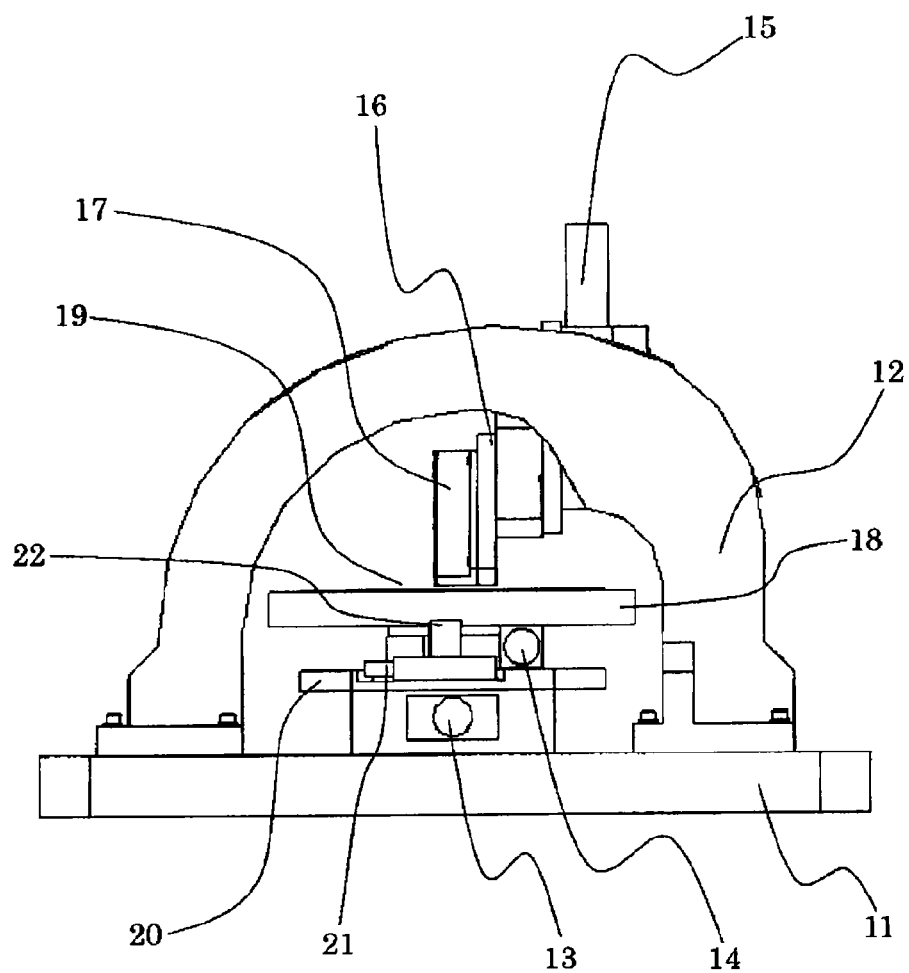
FIG. 4 is a rear view illustrating the probe microscope internal unit of the probe microscope apparatus according to the first embodiment of the present invention.
Figure 5:
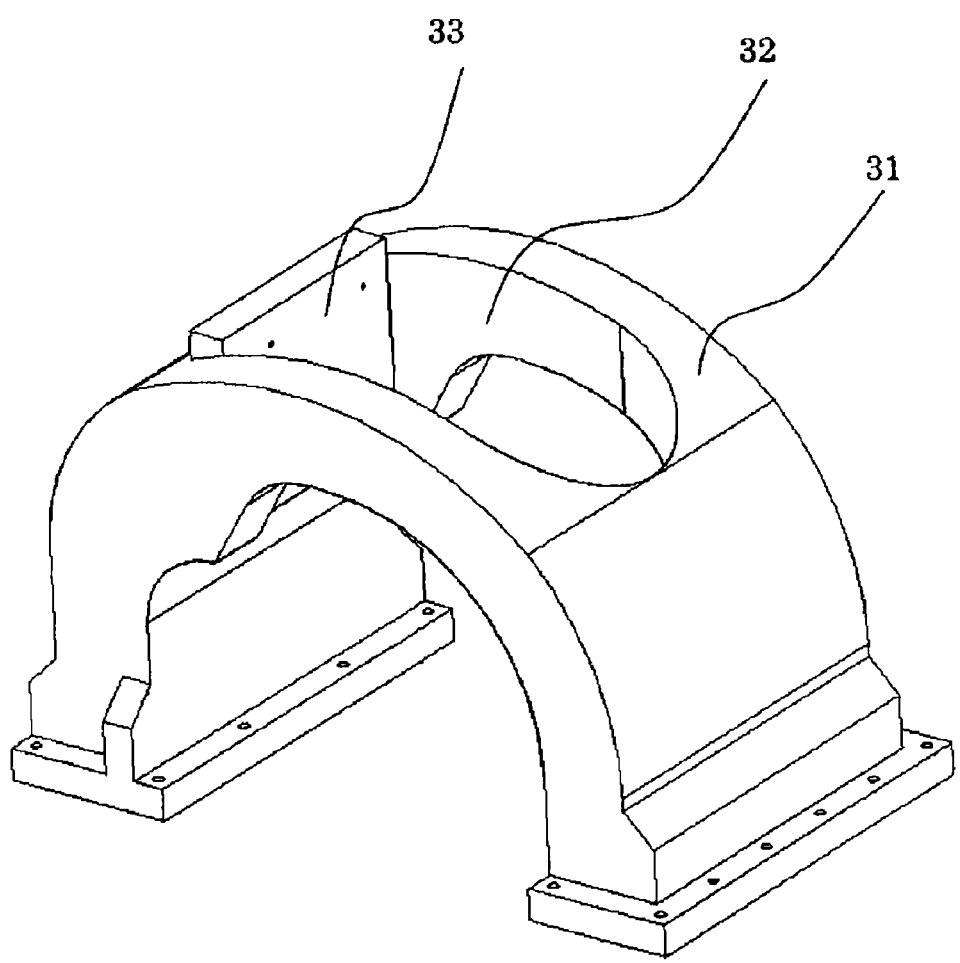
FIG. 5 illustrates a detection means support structure member used for the probe microscope internal unit of the probe microscope apparatus according to the first embodiment of the present invention.

FIGS. 2, 3, and 4 illustrate the probe microscope internal unit in a state in which the acoustic insulating cover 2 is taken off from the probe microscope unit 1. The probe microscope internal unit is provided on a vibration isolation table 10 for protecting a detection portion from floor vibration noise through an elastic member (not shown) for attenuating a high-frequency vibration component. In the probe microscope internal unit, a surface plate 11, a detection means support structure member 12, a Y-axis stage 13 moving straight as an electrically driven stage for sample movement, and a rotating stage θ shaft 14 are held. As illustrated in FIG. 5, in order to make the entire unit structure compact, the detection means support structure member includes an arch curved structure 31. An elliptical hole portion 32 is formed in a central top of the arch curved structure 31. A perpendicular surface 33 to a flat surface portion of a sample stage is formed on a side surface portion of the hole portion in a member thickness direction. In this embodiment, a low-expansion raw material is used and an integrated structure is formed using a casting. A shape of the curved structure is determined based on a catenary curve (catenary). When the detection means is supported on the perpendicular surface 33 illustrated in FIG. 5 to achieve strong connection between the detection means and the curved structure, the curved structure produces an effect that the vibration of the detection means in a falling-down direction which is caused by disturbance vibration is suppressed. Such an effect leads to a reduction in variation between the detection means and the surface of the sample, that is, a noise reduction. For example, the detection means may be supported and suspended from an inner portion of an upper surface of the gate-shaped structure. However, when the strong connection with the curved structure is not achieved, there is a problem that the suspension may cause the vibration of the detection means due to disturbance.

A Z-axis stage 15 which vertically moves is held to the perpendicular surface 33 of the detection means support structure member 12. A fine movement mechanism 17 is held to a Z-shaft through an intermediate member 16. A cantilever holding portion (not shown) and a cantilever (not shown) are held to a tip end portion of the fine movement mechanism 17. The cantilever is held by vacuum suction. The cantilever may be mechanically held using a spring mechanism or held by a magnetic force. The fine movement mechanism 17 contains an optical lever mechanism for detecting a displacement of the cantilever. When an optical system (not shown) is provided in the intermediate member 16 and a mirror is located at the tip end portion of the fine movement mechanism 17, the cantilever and the surface of the sample can be observed through the mirror. A sample holder 18 and a sample 19 are opposed to the cantilever and located on the rotating stage θ shaft 14. A vacuum suction function is provided to the sample holder 18 to hold a thin sample such as a wafer. The entire surface of a sample whose diameter is 360 mm can be measured using the Y-axis stage 13 which operates straight and the rotating stage θ shaft 14. As illustrated in the top view (FIG. 3) and the rear view (FIG. 4) of the probe microscope internal unit, when a cantilever stock member 22 is provided on a plate 20 located on the Y-axis stage 13 through a small X-axis stage 21 which operates straight, five cantilevers can be stocked. A replaced cantilever can be aligned using the Y-axis stage and the X-axis stage.

Figure 6:
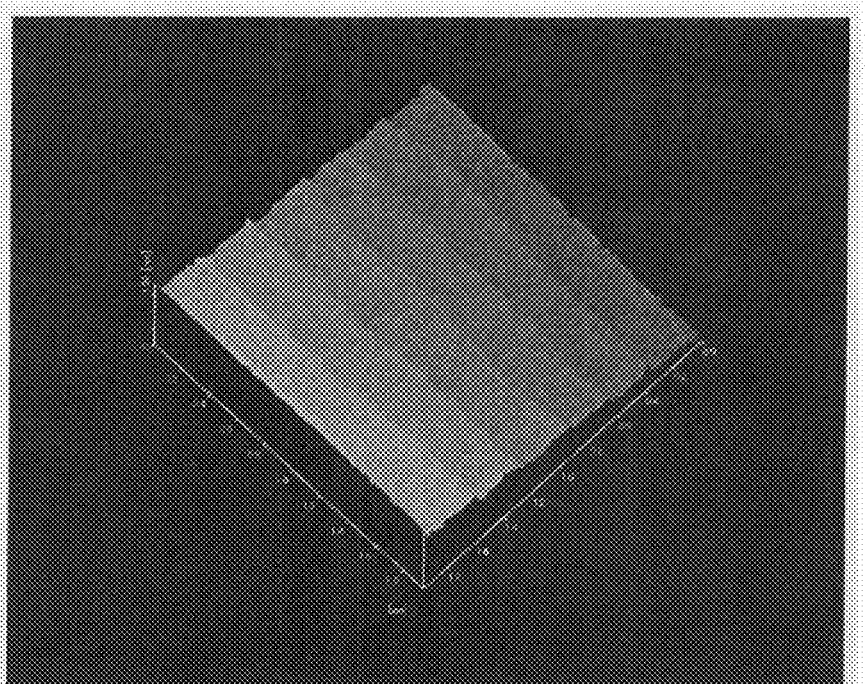
FIG. 6 illustrates an atomic step structure observed using the probe microscope apparatus according to the first embodiment of the present invention.

In this embodiment, the detection means support structure member is formed into the shape illustrated in FIG. 5. Therefore, even when the Z-axis stage 15, the intermediate member 16, and the fine movement mechanism 17 provided with the optical system and the detection portion are held, sufficient rigidity can be obtained, and silicon microroughness or a sapphire ($Al_2O_3$, (0001) plane) atomic step structure can be measured as illustrated in FIG. 6.

In this embodiment, in order to make the probe microscope internal unit compact, the Y-axis stage which moves straight and the rotating stage θ shaft 14 are combined. When a width of the detection means support structure member is increased and a shape thereof is determined based on the catenary curve (catenary) so as to prevent a reduction in rigidity, a unit structure including X-axis and Y-axis stages which move straight may be employed.

A probe microscope according to a second embodiment of the present invention is described with reference to FIG. 7. In an apparatus structure of the probe microscope, the description with respect to the same portions as in the first embodiment is omitted here. FIG. 7 illustrates a probe microscope internal unit located on the vibration isolation table. As in the first embodiment, the probe microscope internal unit is provided on the vibration isolation table for protecting the detection portion from floor vibration noise through the elastic member for attenuating a high-frequency vibration component. In the probe microscope internal unit, a surface plate 41, a detection means support structure member 42, and an X-axis stage 43 and a Y-axis stage 44 which move straight as an electrically driven stage for sample movement are held. A rotating shaft may be provided on the X-axis stage and Y-axis stage. In this case, it is necessary to pay attention to the rigidity of combined stages. As in the first embodiment, the detection means support structure member 42 is made of a low-expansion raw material and integrally formed using a casting.

The Z-axis stage 15 which vertically moves is held to a perpendicular surface 45 which is a side surface of the arch-shaped detection means support structure member 42 in a member thickness direction. The fine movement mechanism 17 is held to the Z-shaft through the intermediate member 16. The fine movement mechanism 17 is identical to that in the first embodiment. Therefore, the cantilever is held in the same manner. As in the first embodiment, the optical system (not shown) is provided in the intermediate member 16. The sample holder 18 is opposed to the cantilever and located on the Y-axis stage 44. A sample is held on the sample holder. The sample is held by vacuum suction as in the first embodiment. The cantilever stock member 22 is provided on the Y-axis stage 44. Therefore, as in the first embodiment, five cantilevers are stocked. A replaced cantilever is aligned using the X-axis stage and the Y-axis stage.

In this embodiment, the detection means support structure member having the curved structure is used. Therefore, even when the Z-axis stage 15, the intermediate member 16, and the fine movement mechanism 17 provided with the optical system and the detection portion are held, sufficient rigidity can be obtained and the same high-resolution measurement as in the first embodiment can be performed.

As described above, with the probe microscope including the apparatus structure according to the present invention, the detection portion is supported with high rigidity. Therefore, a natural vibration frequency of a measurement portion included in the detection portion can be set to a value higher than a vibration frequency influencing measurement, and thus high resolution can be ensured.

The present invention is not limited to the embodiments described above and thus can be applied to all apparatuses in which the influence of disturbance vibration is minimized to require high resolution, including an apparatus for analysis, inspection, or measurement.

What is claimed is:

1. A structure of an apparatus for performing analysis, inspection, and measurement, comprising:
   a sample holder on which a sample which is an object to be analyzed, inspected, and measured is located;
   a sample stage on which the sample holder is located;
   a support structure member having an arch shape;
   detection means for detecting a detection value for analysis, inspection, and measurement, the detection means being opposed to the sample and supported on a perpendicular surface which is formed, in a member thickness direction, in a portion of the support structure member having the arch shape and which is substantially perpendicular to a flat surface portion of the sample holder; and
   moving means for finely moving the sample stage in at least one axis direction.

2. An apparatus structure according to claim 1, wherein the arch shape of the support structure member is formed with a curve consistent with a catenary curve.

3. An apparatus structure according to claim 1, wherein the support structure member which supports the detection means and has the arch shape is integrally formed.

4. An apparatus structure according to claim 1, wherein the perpendicular surface is formed, in a member thickness direction, in a side surface portion of a hole portion formed in an upper bottom portion of the support structure member having the arch shape.

5. A scanning probe microscope, comprising the apparatus structure according to claim 1.

* * * * *